(12) United States Patent　　(10) Patent No.:　　US 8,856,908 B2
　　Michel　　　　　　　　　　　　　　(45) Date of Patent:　　Oct. 7, 2014

(54) MANAGEMENT AND DELIVERY OF PROFILE DATA

(75) Inventor: Walter F. Michel, Glenside, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 1087 days.

(21) Appl. No.: 12/370,426

(22) Filed: Feb. 12, 2009

(65) Prior Publication Data

US 2010/0205261 A1　　Aug. 12, 2010

(51) Int. Cl.
```
G06F 7/04        (2006.01)
G06F 15/16       (2006.01)
G06F 17/30       (2006.01)
H04L 29/06       (2006.01)
H04N 21/658      (2011.01)
H04N 21/6547     (2011.01)
H04N 21/442      (2011.01)
H04N 7/173       (2011.01)
H04N 21/44       (2011.01)
H04N 21/258      (2011.01)
H04N 21/81       (2011.01)
```

(52) U.S. Cl.
　　CPC ....... H04N 7/17318 (2013.01); H04N 21/6582 (2013.01); H04N 21/6547 (2013.01); H04N 21/44222 (2013.01); H04N 21/44016 (2013.01); H04N 21/25891 (2013.01); H04N 21/812 (2013.01)
　　USPC .......................................................... 726/9

(58) Field of Classification Search
　　CPC .................................................. G06F 21/6254
　　USPC .......................................................... 726/9
　　See application file for complete search history.

(56) References Cited

U.S. PATENT DOCUMENTS

2009/0113039 A1*　4/2009　Savoor et al. ................. 709/224
2009/0125710 A1*　5/2009　Park et al. ......................... 713/2
2009/0133059 A1*　5/2009　Gibbs et al. ..................... 725/34

FOREIGN PATENT DOCUMENTS

EP　　　1162840　　12/2001
WO　　02/13112　　2/2002
WO　　2008/013707　　1/2008

OTHER PUBLICATIONS

European Patent Application No. 10153227.3 Extended European Search Report dated May 2, 2011.

* cited by examiner

*Primary Examiner* — Dant Shaifer Harriman
(74) *Attorney, Agent, or Firm* — Banner & Witcoff, Ltd.

(57) ABSTRACT

Aspects of the invention relate to systems and methods for securely retaining profile data and the use of such data for the targeted delivery of content. In one embodiment, a unique profile that represents the user location and is keyed to profile attributes selected from both a first set of data collected from the user location and the second set of profile data collected from an external source, is generated. The key does not allow a third party to identify the end-user location or a user associated with the end-user location. Electronic content transmitted to end-user locations may be encoded such that it may only be accessed by an authorized user and/or on a specific electronic device at the user location. A graphical user interface may be utilized to allow a third-party to provide selection criteria for determining user locations to receive targeted content. Further aspects of the invention relate to an electronic device configured to present targeted content to a user at a user location.

31 Claims, 5 Drawing Sheets

| | CRITERIA A 412 | CRITERIA B 414 | 416 Channel | 418 Secondary Data |
|---|---|---|---|---|
| 404 USER 1 | ✓ | ✗ | | |
| 406 USER 2 | ✓ | ✓ | 117 | |
| 408 USER 3 | ✓ | ✓ | 916 | User requested additional content |
| 410 USER 4 | ✓ | ✓ | — | |

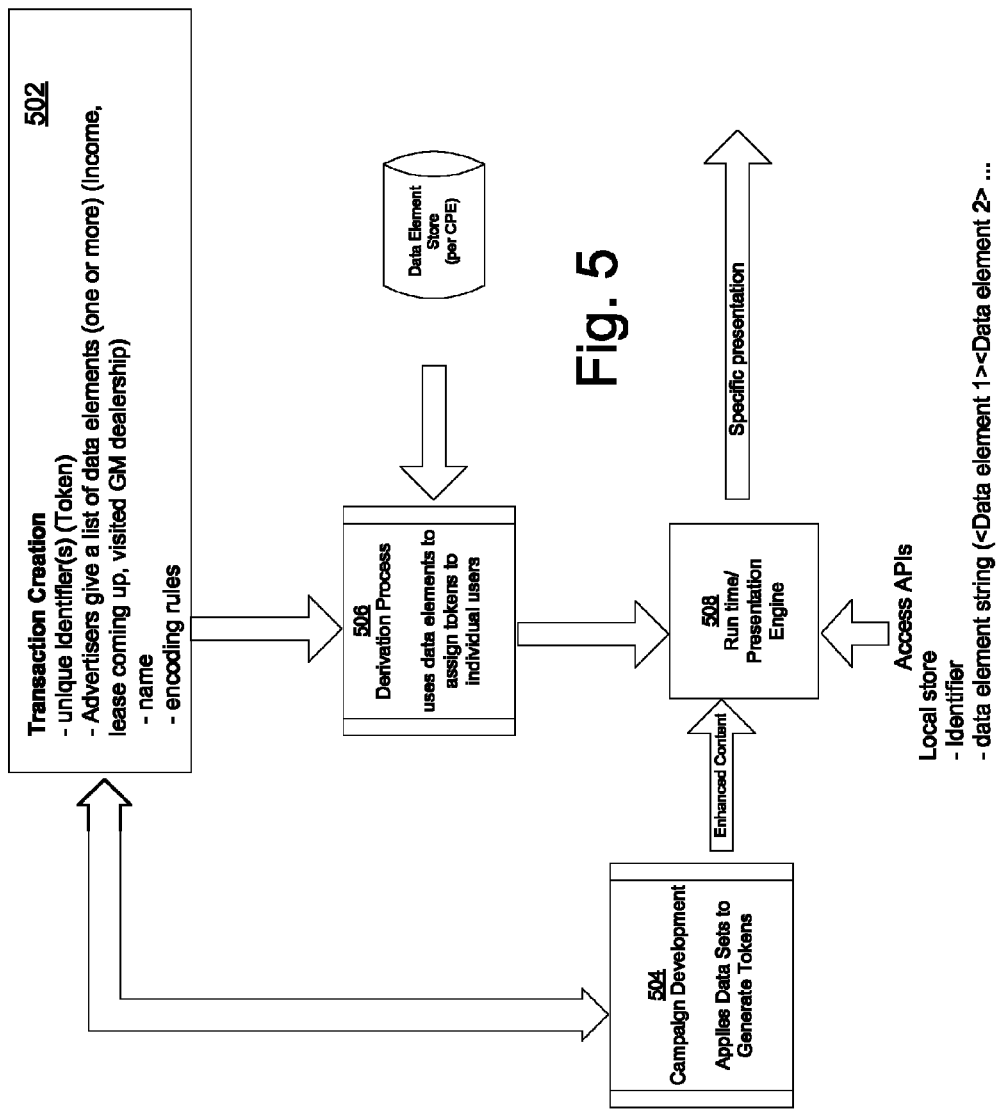

MANAGEMENT AND DELIVERY OF PROFILE DATA

FIELD OF THE INVENTION

The field of the invention relates generally to systems and methods for controlling delivery of media content. More particularly, aspects of the invention relate to controlling the transmission of targeted media to specific audiences. Further aspects relate to allowing third-parties to provide selection criteria or control data for the delivery of targeted media, application, application behavior or messaging.

BACKGROUND

The integration and delivery of high-definition interactive television and the possibility of providing several hundred broadcast channels to television viewers has allowed users to receive highly individualized content. This ability to satisfy multiple individualized demands is even more apparent with systems having video-on-demand and internet functionality. Indeed, in addition to seeking specialized broadcasting programs, users now desire individualized advertising and other secondary content. Unfortunately, several modern advertising systems force users to watch (or listen to) content for goods and services that are neither needed nor desired. As expected, consumers have become impatient and dissatisfied with these systems. Likewise, advertisers want to optimize their advertising expenditures by ensuring that specific advertisements are directed to the appropriate audiences. Specifically in regards to television programming, advertisers want specific advertisements to air during programming that is being viewed by those individuals most likely to be influenced to buy the advertised product, or otherwise respond in a desired fashion to the advertisement. U.S. Pat. No. 6,463,585, assigned to the present assignee, and herein incorporated by reference in its entirety, describes various targeted advertising systems.

Current targeted advertising solutions lack considerations regarding consumer privacy, access privileges, and security. There is a need to prevent profile data relating to a user or a household (for example, but not limited to: demographic, behavioral, and/or psychographic data) from being transmitted through a network to a remote location and to prevent profile data from being readily accessible by third-parties with access to the set-top box or other advertising delivery mechanism (e.g., a computer). Thus, novel systems and methods for improving the efficiency and security of delivering targeted content to different user locations would be beneficial to the art.

SUMMARY OF THE INVENTION

The following presents a simplified summary of the disclosure in order to provide a basic understanding of some aspects of the invention by way of exemplary embodiments. These embodiments do not define key or critical elements of the invention or to delineate the scope of the invention. The invention is defined by the claims. The following summary merely presents some of the concepts of the disclosure in a simplified form as a prelude to the more detailed description of aspects of the invention provided below.

Aspects of the invention relate to systems and methods for securely retaining profile data and the use of such data for the targeted delivery of content. As used herein, the term "profile data" refers to any type of information relating to an account, device or individual user, including demographic, behavioral, psychographic, as well as information regarding the usage of one or more applications of electronic devices by a user or users at an end user location. Profile data relating to a specific account, device, or user collectively forms the "profile" of that account, device, or user. In one embodiment, data is collected from an electronic device at a user location to form a first set of profile data. The electronic device may be a set-top box, computer, modem, or other device configured to receive content from a broadcast provider. The content may include: audio, video, data, and/or multimedia content configured to be displayed on an internet browser, a computer, a television, portions of a screen, a banner, within applications and combinations thereof. The profile data may be, for example, usage patterns regarding the electronic device. The profile data may be obtained or generated from a number of different sources including internal and external sources. The data may be encrypted and stored locally at the user's location. In one embodiment, the first set of profile data is stored locally at the user location, such as on the electronic device.

Additional profile data relating to a user may be collected from a source external to a service provider that provides services to one or more of the electronic devices. The additional data may originate from one or more different sources and be combined with data obtained from the service provider. In one embodiment, a unique profile that represents the user location and is keyed to profile attributes selected from both data derived from services provided by the service provider and data obtained from external sources. Aspects of the invention prevent an unauthorized third party, application or sub-system from determining the data including identification of the end-user location, a user associated with the end-user location, or data associated with the end user location or end user. For example, the data may be encrypted using a session key, or a public key algorithm. The data may then be downloaded to the individual set top box and stored locally. The data may be decrypted using the session key or public key algorithm running in the local device, e.g., a secure micro in a set top box and/or a secure portion of a cable card in an electronic consumer device. The algorithm for accessing the profile data may reside in a set top box, a wireless router, and/or a security module such as a cable card device.

In certain embodiments, a request from a third party may be received that requests content to be transmitted to a plurality of user locations that meet criteria regarding a plurality of profile attributes. In one embodiment, electronic content comprising a plurality of portions may be transmitted to those (or a subset of those) user locations. The electronic content may be encoded such that it may only be accessed by an authorized application, sub-system and/or on a specific electronic device at the user location. In further embodiments, a graphical user interface may be utilized to allow a third-party to provide selection criteria for determining a plurality of user locations to receive targeted content. The content may then be filtered using the profile at the end user location and delivered on a selective basis. Statistics on content delivery based on the profile may be aggregated and reported to a centralized location either at the head-end or other network operations center or to a remote reporting center located on, for example, a virtual private network (VPN) or the Internet.

In certain embodiments, a portion of the electronic content is presented based upon at least one profile attribute of a profile. In one embodiment, the transmitted content may include a plurality of advertisements and the portion of the content presented to a user of the electronic device is one of the plurality of advertisements. In one such embodiment, the advertisements are downloaded to a computer-readable medium at the user location and a decisioning module at the user location selects one of the advertisements from the plurality of advertisements to present to the user. For example, the computer readable medium may be a hard drive, a solid state drive, and/or an optical drive. The computer readable medium may be, for example, an internal or external drive. The computer readable medium may be a digital video recorder (DVR) including any internal or external SATA hard drives.

Further embodiments may determine whether a profile attribute represented within the profile has changed. In one embodiment, a second portion of the content from the plurality of content may be presented at the user location upon the determination that a specific profile attribute has changed. For example, where a user has changed location from one house to a new house, the user may be presented with advertisements for a security system or for VoIP phone service. In another example, an application instantiation may modify the profile to condition the behavior of future application instantiations on the same or different service delivery device. In another embodiment, additional content may be requested. For example, the change in viewing habits may prompt a request for additional content such as where specific programming is being watched on a regular basis. This may trigger a secure upstream request for a change of profile data associated with the set top box. Confirmation that the content was transmitted and/or presented at the user location may further be conducted. In still further embodiments of the invention, the users may be offered a discount on the monthly service charges if the user permits certain types of targeted advertisements along with reporting associated with the advertisements. For example, the user may be offered incentives if the user agrees not to fast forward the commercials in recorded programs and reporting of recorded commercials to a remote agency on an aggregate basis.

Further aspects of the invention relate to an electronic device configured to present targeted content to a user at a user location. In one embodiment, the device comprises an input port configured to receive a broadcast service and further includes a memory configured to record usage patterns of the electronic device in relation to the broadcast service. In one embodiment, a processor may be configured to generate a unique profile string from the usage patterns stored in the memory and profile data obtained from an external source. In yet another embodiment, the device comprises a computer-readable medium that comprises computer-executable instructions that when executed by a processor perform a method for creating a unique profile or modifying an existing profile. In one embodiment, the unique profile is a secure string that represents the user location and is keyed to profile attributes selected from both the usage pattern and external profile data, wherein encryption or other physical and/or electronic security is designed to prevent a third party from identifying the end-user location or a user associated with the profile data.

Of course, the methods and systems of the above-referenced embodiments may also include other additional elements, steps, computer-executable instructions, or computer-readable data structures. For example, different embodiments may incorporate one or more aspects of the invention defined above or one or more features of the detailed description below into other aspects of the invention. Additional features and advantages of the invention will be apparent upon reviewing the following detailed description.

BRIEF DESCRIPTION OF THE DRAWINGS

The present disclosure is illustrated by way of example and not limited in the accompanying figures in which like reference numerals indicate similar elements and in which:

FIG. 4 shows a table of exemplary users that may receive targeted content according to an illustrative embodiment of the invention; and FIG. 5 is a flowchart showing an exemplary method of conducting an advertising campaign in accordance with an embodiment of the invention.

DETAILED DESCRIPTION

Exemplary Systems and Definitions

Aspects of the invention relate to the transmission of content, such as multimedia and communications data, between a delivery platform and one or more electronic devices at an end-user location. As used herein, the term "delivery platform" refers to any data, application or media source that serves as an origination platform. Exemplary delivery platforms included, but are not limited to: a broadcast content source, on demand platform, web based content source, data carousel, data server, and combinations thereof. As used herein, the term "electronic device" refers to an apparatus that includes a memory and one or more logic devices such as one or more processors, wherein the memory is configured to include either computer-readable instructions or a state machine for performing certain logic operations, such as navigating, selection, transmitting or receiving multimedia content and/or communication data. Exemplary electronic devices include, but are not limited to: a set-top box, a telephone, a cable modem, televisions, mobile and desktop phones, computers (i.e., mobile, laptop, desktop), blue tooth enabled devices, picture frame displays, appliance displays and combinations thereof.

As used herein, the term "set-top box" is used to describe an apparatus that is configured to navigate, select, receive and provide an output of multimedia content from a provider such as a broadcast, unicast, multicast, and/or video on demand, Internet, private network, or other provider (hereinafter content provider). The content provider may include a cable system, satellite system, fiber optic system, telephone system, mobile car TV system, phone TV system, power system, or other system associated with providing content navigation, selection and distribution services to a user (including business) location. Moreover, a set-top box is not required to be a separate apparatus, but rather would encompass a television and/or DVR configurable to receive the media content. Indeed, any device that is configurable to receive and provide an output signal comprising media content from a broadcast provider falls within the term set-top box as used herein. The apparatus(es) that form the set-top box may include one or more processors, ASICS, memories, user interfaces, and other features to facilitate the operation thereof. An apparatus may interact with other delivery or control platforms to navigate, select, and receive content. Content may include data, applications, broadcast media, on demand media, and combinations thereof.

Exemplary System

Figure 1A:
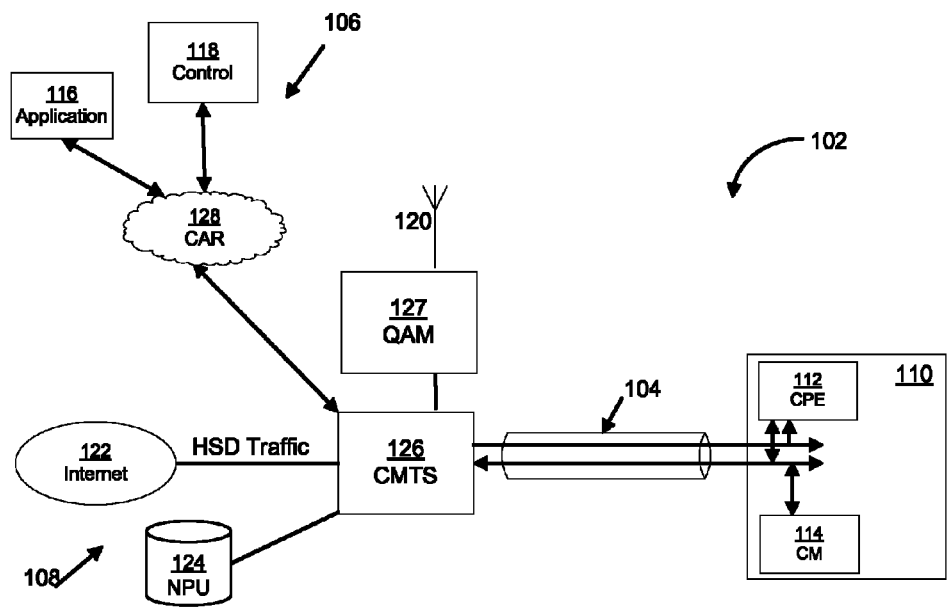
FIG. 1A shows an exemplary system in accordance with one embodiment of the invention.

FIG. 1A shows an exemplary system in accordance with one embodiment of the invention. Those skilled in the art with the benefit of this disclosure will readily appreciate that the teachings of the invention may be utilized on several different service delivery platforms; however, exemplary aspects and embodiments thereof will be explained in relation to an exemplary system shown in FIG. 1A to readily convey certain aspects and embodiments. In this regard, additional or fewer components may be utilized in the exemplary system 102 without departing from the scope of the invention.

As seen in FIG. 1A, exemplary system 102 may include communication medium 104 for transmitting data over a network including advertising content and profile data which may be associated with a particular end user account. The medium 104 may include, for example, fiber optic cable, coax, hybrid fiber coax (HFC), one or more wireless connections, satellite transceivers, or any combination of mediums that may transmit or receive content. For example, the medium 104 may transmit television content over a portion of the spectrum/time slots and the advertising content over another or the same portions of the spectrum/time slots, and the profile and control data over another or the same portions of the spectrum/time slots. For example, the video programming may be transmitted over the quadrature amplitude modulated (QAM) channels while the control for the advertising may be transmitted over QPSK modulated data channels. Further, the systems 102 may be conceptually divided into one or more portions such as a relatively lower speed wireless portion 106, a relatively High Speed portion 108, and one or more network components 110. The advertising data and profile data may be provided in secure fashion from one or more of the network components 108. For example, the network components 108 may variously include such components as the Internet 122, one or more network processing units 124 (including media servers and advertising servers), one or more modem termination systems (e.g., a cable modem termination system (CMTS) 126, and one or more terrestrial and/or satellite antenna systems 120, modulators including QAM modulators 127, QPSK modulators, modem termination systems, VoIP servers including soft switches, policy servers (for example, providing advertising related policies), TFTP servers (for example, providing control information including profile data), central repositories for storing data, such as billing information, advertising information, profile data, matrix switches, and/or other similar devices. The network components may cooperate to provide management/application/voice/video/multimedia/advertising and/or data services over the medium 104 to a high speed data portion such as an end-user location 110.

The end-user location 110 generally relates to one or more features, devices, and applications located at a user's location (e.g., customer premises equipment (CPE)) which may be operatively connected and configured to interface with one or more broadcast providers and/or end-users at the user location in relation to media services associated with the cable system provider. For example, the end user location 110 may be configured to provide targeted advertisements to the users based on profile data obtained locally, from the network components 108, and/or from other external sources such as direct marketing companies. The end-user location may include any number of electronic devices, including various customer premises equipment ("CPE") 112 with may include one or more cable modems ("CM") 114, televisions, computers, phones and/or other display devices. The cable modem 114 may be variously configured to include a router, a wireless router, a cable card, a security module, and/or other devices that incorporate a modulator and/or demodulator. As used herein, customer premise equipment may include electronic devices that are supplied, authorized or approved by the broadcast provider for receiving services provided by one or more broadcast providers. For example, a user may rent, purchase, or lease a set-top box from the cable company to receive at least a portion of the programming provided through the communication medium 104. The set-top box may be configured to include a security module in secure communication with one or more of the network components 108 for distributing, maintaining, and managing profile and targeted advertising content. The security of this profile and targeted advertising data may be enhanced by maintaining some of the data locally and some of the data at a remote location.

The wireless portion 106 may include an application portion 116, a control portion 118, and/or a receiver/transceiver portion 128 such as a mobile car or phone. The control portion 118 may include systems configured to facilitate controlling, provisioning, managing, and/or securing the wireless portion 106. The application portion 116 may be configured to provide applications to the wireless portion 106 such as video on demand, television, interactive television, and/or other services. Targeted advertisements may also be distributed to the wireless portion based on secure profile data stored locally in the wireless portion 106.

The antenna portion 120 may cooperate with the application portion 116 and control portion 118 to support video and advertising operations associated therewith and/or it may act independently to provide television, music, video, and other multimedia services to the wireless portion 106 responsive to profile and user data associated with users of the wireless portion 106 stored in the high speed data portion (e.g., in the customer premises equipment). The wireless portion 106 and/or high speed data portion 110 may be configured to operate according to or support the operation of any number of protocols, applications, and procedures, including applications such as television programming (cable, satellite, broadcast, Internet, etc.), Video on Demand (VOD), interactive television (iTV), interactive gaming, pay-per-view (PPV), and protocols such as, Hyper Text Transfer Protocol (HTTP), Dynamic Host Configuration Protocol (DHCP), Syslog, Simple Network Management Protocol (SNMP), Trivial File Transfer Protocol (TFTP), Data Over Cable Service Interface Specification (DOCSIS), Domain Name Server (DNS) applications, DOCSIS Settop Gateway (DSG), out-of-band (OOB) messaging, and/or various modulation schemes including QAM and QPSK.

The CMTS (Cable Modem Termination System) 126 may be configured to send and receive signals over the communication medium 104, such as between the Internet 122 and the CPE 112 and the CM 114. The CMTS may route profile data and/or targeted advertisements to particular subscribers. Alternately, the advertisements may be broadcasts over a QAM channel (see, e.g. QAM 127) or other broadcast channel located based on secure profile, user preference, and/or user viewing habit data.

Once received at the end-user location 110, specific data, such as QoS (Quality of Service) configuration files, may be received at CM 114, while other information, such as audio-visual multimedia delivered in a specific format (i.e., MPEG-2) may be received at other equipment, such as CPE 112. Further, the CM 114 and the CPE 112 may be integrated as one component. In the integrated configuration, the devices may share security processors for encrypting and/or securely storing the targeted advertising data and/or the profile data.

The network components 108 may provide data services for the system 102, including services for the CM 114 to access the Internet 122 and for the CPE 112 to access profile and configuration data associated with the particular user over a secure path such as an encrypted virtual private network. It may include a network element, such as a network provisioning unit (NPU) 124. The NPU 124 may be configured to support any number of activities associated with the electronic devices including provisioning with respect to targeted advertisements. In accordance with one non-limiting aspect of the present invention, the NPU 124 may include capabilities to facilitate configuring the electronic devices, such as by distributing bulk configurations files to one or more the electronic devices. The bulk provisioning files may include files for provision advertising content within the set top box including profile data associated with a particular location including users within that location. It may be configured to communicate with the electronic devices through any number of protocols, applications, and communication mediums, including DHCP, HTTP, SNMP, TFTP, and the like, and particularly including secure protocols such as a virtual private network (VPN) connection with the NPU 124 in the network components 108 portion of system 102.

The receiver/transceiver portion 128 may be configured to connect the wireless network 106 to the network components 108 such as to the CMTS 126 and/or other suitable network components 108. The receiver and/or transceiver 128 may transport signals using any suitable protocol including IP, DVB, and/or other suitable video streaming protocols including V Cast.

Exemplary CPE

Figure 1B:
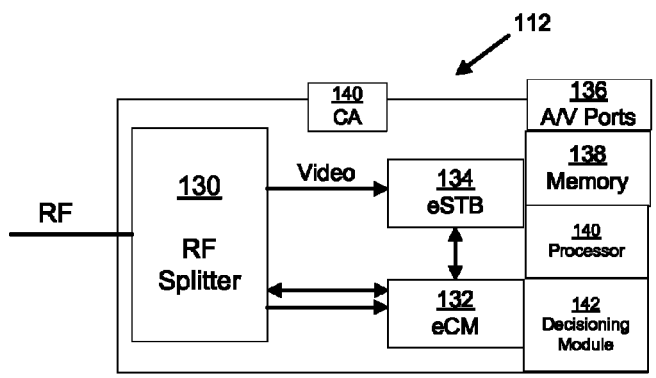
FIG. 1B illustrates an exemplary CPE in accordance with an embodiment of the present invention.

FIG. 1B illustrates an exemplary CPE, such as CPE 112 shown in FIG. 1A, in accordance with an exemplary embodiment of the present invention. The CPE 112 may be variously configured. While a RF Splitter 130 is shown, the splitter is optional. For various fiber and pure digital television application, a splitter is not required. The CPE may or may not include a one or more embedded cable modem (eCM) 132, one or more embedded set-top box(s) (eSTB) 134, one or more ports such as audio visual (A/V) ports, network ports, infrared ports, bluetooth ports, telephone ports, and/or wireless ports 136, a memory (e.g., volatile and/or non-volatile) 138, one or more conditional access (CA) unit(s) 140 (e.g., a secure microprocessor, encryptor/decryptor, and/or cable card), and one or more processing elements such as logic and/or one or more processor(s) 142. In exemplary embodiments, the conditional access unit(s) 140 are utilized by the CPE 112 and/or network components 108 to securely transmit, receive, and store both external profile data associated with the user's location as well as locally generated profile data including viewing habits encoded within the encoded string.

The advertising data may be downloaded either out of band using, for example, a data channel and/or the embedded cable modem. Alternatively, or in addition, the advertising data may be downloaded in-band using, for example a QAM demodulator associated with the eSTB 134. In one embodiment, the configuration files for the targeted advertisement are sent on an out-of-band control channel using QPSK modulation. In this embodiment, the out-of-band and/or two-way secure targeted advertising configuration and control data may be relayed to the eCM 132 and the targeted advertising multimedia content may be separately relayed to the eSTB 134 which can alternatively be transmitted and stored in a non-secure manner. Where privacy is a major concern, the targeted advertisements may be filtered at the input based on secure locally stored user viewing data and/or other profile data and then stored in a secure manner. In this way, a simply review of the advertisements stored, for example, on the DVR will not reveal or give clues to the user's viewing habits and/or profile data received from, for example, a direct marketing agency.

The eSTB 134 may be configured to manipulate signals and output video and other media signals to a media output device such as an external E-SATA hard drive (not shown) and/or to the memory 138 which may include a digital video recorder. In this manner, the advertisements coming from the medium 104 may be filtered based on the profile data and then processed through eSTB 134 so that they may be stored locally and potentially securely in memory 138. The decryptor/encryptor in the eSTB box may be loaded with a key and utilized to store securely any targeted advertisements which are filtered and stored based on viewing habit data and/or other profile data concerning the particular household.

The eCM 132 may be configured to process and control other signals, such as advertising control signals. These signals may then be utilized by the processors and/or logic 140 to control the eSTB to filter advertisements. In exemplary embodiments, the advertisements may be downloaded late in the night (e.g., at 3:00 am) by tuning one of the tuners in the eSTB to a channel to download targeted ads. The ads may stay resident until they have actually been viewed (and not fast forwarded), thus eventually guaranteeing that the occupant of the household will eventually see the advertisement. The control information concerning advertisements may be sent through a secure tunnel with a secure server located in one of the network components 108. A VPN network is one example of a secure tunnel. The eCM 132 may include network communication capabilities for bi-directional communication of data signals with the network components 108. In this manner, the network components may query the various end user devices in the system such as wireless portion 106 and/or high speed portion 110 to determine actual viewing rates for the advertisements. In this manner, third-party audience measurement services may be supplemented or eliminated. For example, in a secure manner, using embodiments of the invention, the servers supplying advertising to the mass market may aggregate and report the number of users within each category who actually saw the particular advertisement placed.

The CA unit 140 may be configured to provide conditional access control for the CPE 112. It may include or be configured to receive a CableCard, SmartCard, or other item for controlling security and access to the data, video, and control signals transmitted over the communication medium 104. The CA unit may be a secure microprocessor that forms part of the eSTB and/or a separate unit from the eSTB. It is illustrated as a standalone item, however, it can be included with or embedded on the eSTB 134 or the eCM 132 to perform similar functions. For example, the CA unit 140, eSTB 134, and/or eCM 132 may include a public key algorithm for exchanging a session key with the advertising server located as part of the network components 108. This enables the advertising server with access to the direct marketing data as well as the server hosting the web portal for advertising purchases to exchange data securely with the user equipment. For example, a first security algorithm and/or session key may be utilized between the advertising server and the direct marketing data supplier. Another security algorithm and/or session key may be utilized between the advertising server and the server hosting the web portal. For example, the web portal may be hosted by a service provider. In yet another embodiment, a web portal may be hosted by an industry-wide consortium or aggregate of service providers. In one embodiment, orders placed on a web portal operated by one or more entities may be securely transferred to an advertising server on an information provider's advertising server using a secure protocol and/or session key. For example, orders and content input through a multi-party web portal may be transmitted to a first service provider (i.e. a cable operator) using one session key/protocol and to another service provider using another session key/protocol. Further, targeted advertising orders may be secured using a different session key/protocol than the advertisements. In some cases, the advertisements themselves may not be secured while the order specifying which types of users are to be targeted with the ad is secured. Subsequently, the advertising server as part of the service provider's network components 108 may forward the advertisements to certain of its end users based on profile data stored securely and resident only at the service provider's network components 108 and/or the end user equipment such as wireless portion 106 and/or high speed portion 110.

The eCM 132, eSTB 134, and CA unit 140 may be logically separate entities, however, they may physically share hardware and software. Other items, such as control logic and applications may be included on the CPE 112 for controlling operation of the eSTB 134 and/or the eCM 132. For example, the CA unit 140 may be implemented as a secure microprocessor or cable card as part of the eSTB 134. Advertisements, profile data, and/or user viewing habits may be routed through the CA 140 and/or through the eSTB 134 for encryption/decryption.

The CPE 112 may further comprise a decisioning module 142 which, as discussed below in more detail, may determine what portion of content, such as an advertisement to present to a user or record for later presentation. The decisioning module may be a separate entity (as shown), yet in other embodiments, the decisioning module may be implemented in any module, including processor 140, that may execute computer-executable instructions, such as those stored on memory 138 to determine which portion of content to present to the user. The decisioning module 142 may, for example, review the data forwarded by an advertising server in the network components 108 and begin accumulating advertising from the advertising server based on known profile data for the end-user or apparatus. In yet another embodiment, the decisioning module 142 may be partially or wholly implemented in an upstream head end device, such as head end device 304 (discussed below). Yet in still another embodiment, the computer-executable instructions utilized in determining which portion of the content to the user may be included within the application stream containing the content.

The advertisements may be accumulated by selecting particular content from a particular location at a particular time and/or based on a particular program ID. The content may or may not be encrypted. In exemplary embodiments, for some applications, once the targeted ads are located and filtered for a particular user based on a particular campaign placed on, for example a web portal, the profile data of the end-user or apparatus profile, the advertisements are encrypted and stored locally for later insertion into the video stream. For example, certain cable subscribers may be offered a discount if they opt to see one additional targeted advertisement per hour. More frugal users might opt to have the cable company increase the advertisements in a particular program by inserting an additional 30 second ad from the cable company in all DVR recorded programs. The above descriptions of FIGS. 1A and 1B are exemplary, and are thus only intended to provide guidance on possible devices, applications, and configurations which may be used for implementing aspects of the inventions described herein. One skilled in the art will realize that other configurations may also be utilized in various aspects of the invention.

Exemplary Methods

Figure 2:
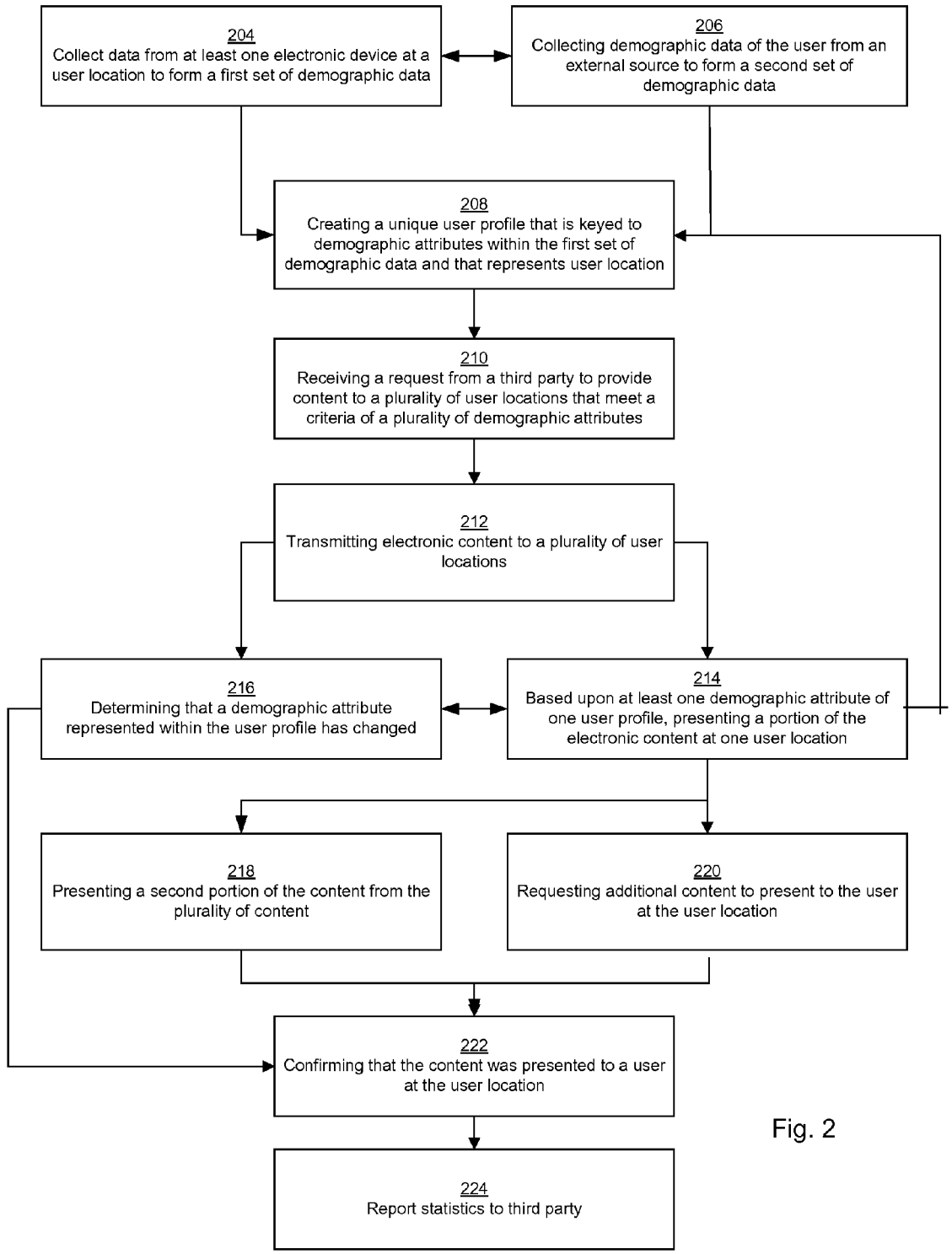
FIG. 2 is a flow chart of an exemplary method for transmitting targeted content to an end-user location in accordance with an embodiment of the invention.

FIG. 2 is a flow chart of an exemplary method for transmitting targeted content to an end-user location. At step 204, data is collected from at least one electronic device at an end-user location to form a first set of profile data. In one embodiment, the collection of data at step 204 may be a continuous process or performed on a routine basis. Certain types of data, however, may not change on a routine basis, for example, information regarding the identification and/or activation of a device, such as an unique identifier generated by the broadcast provider or a third party (i.e., MAC address), an ID for a specific user of a device, chronological data relating to the activation of a device, or combinations thereof. For example, part of the end-user location data may include whether the end user has a wireless network router, the number of computers in the home, the type, number, and configuration of the set top boxes (including DVRs), the type of wireless service, etc.

Other types of data may be collected based upon user-based actions, such as usage patterns of the electronic device(s). For example, broadcast media subscribers, such as cable TV subscribers, generally receive a tier of services for an agreed-upon price. The tier of service may include multiple television and music channels, internet connectivity and/or telephone services. In this regard, data may be collected regarding the monthly expenditures for one or more of these services, the number of electronic devices utilized to access one or more of the services, and combinations thereof. Indeed, any data regarding the use of one or more electronic devices is within the scope of this disclosure. This data collection step may also include various user viewing criteria. However in preferred embodiments, this data is securely stored in encrypted format. Further, the data collection may optionally be enabled or disabled by the end user as part of the set-top box setup routine. This option may be enabled or disabled by the user as part of the menu options in the set top box. The user may optionally be provided an incentive to allow the option to be enabled including the addition of an additional service or channel in the lineup. The incentive may be tailored to the individual user by, for example, using the profile and/or direct advertising data to target a channel or incentive that might be of particular interest to the user. Further, the usage data may be subdivided into television usage and/or data usage. In one embodiment, a user associated with one or more profiles may be provided the option to enable one type of user viewing habits (e.g., television programs) and disable other types of user viewing habits (e.g., web pages).

Other profile data may be gathered as part of providing the user with one or more services such as the data collected at step 204. This may include data collected as part of a user requesting or applying for services, input provided by questionnaires or discussion forums, and by other means. To ensure the security of the data, the first set of profile data is stored locally at the user location and may optionally be encrypted. For example, in one embodiment, memory 138 of CPE 112 includes computer-executable instructions that when executed by a processor, such as processor 140 records usage patterns for that CPE device (and possibly other networked electronic devices). For example, data relating to the channel, programming, time of day, DVR recordings, and combinations thereof regarding the viewed programming may be stored in memory, such as memory 138. The data may be secured inside a secure location that includes one or more tamper resistant techniques such as the EEPROM in a secure microprocessor, a tamper switch, and/or an epoxy or other resin coated memory.

The data collected in step 204 may be encrypted and therefore not accessible by unauthorized parties. In yet other embodiments, the data may be stored external to the electronic device to which the data relates preferably in a secure form. For example, the data may be stored in an external DVR recorder in encrypted form. Storing the data locally does not require that it be stored on the device in which the usage patterns or other profile data was collected from; rather, it may be stored either on a device selected by the user or a device within the user's location. In this regard, the raw data is not transmitted externally through a network without the user's knowledge. Further, the menu on the set top box may alternatively be provided with a device allowing the user to periodically purge the viewing habits data from his/her devices.

At step 206, profile data from one or more sources external to the user location is collected to form a second set of profile data. Exemplary data may include, but is not limited to: the value of the user's home, any income information, such as provided in a credit statement, the quantity, age, and/or gender of any children, education, credit score, memberships, buying habits, health history, political affiliations, no-call lists, and combinations thereof. Any profile data from a source external to the service provider of the data collected in step 204 may be collected step 206. Like step 204, step 206 may be a continuous or ongoing process. In one embodiment, steps 204 and 206 may occur simultaneously. In another embodiment, data collected in one step may affect the data collected in another step. For example, if at step 204, usage patterns of an electronic device, such as a set top box 112, indicate that children's programming is suddenly being viewed for an extended duration, profile data specifically regarding children may be collected at step 206. Some third-parties may not wish to disclose proprietary information, such as their customer lists or even the fact that they are advertising a specific promotion. Therefore, in one embodiment, at least a part of the information collected at step 206 is encoded to prevent the content provider from knowing specific information within the content.

At step 208, a profile with a unique identifier and encoding scheme may be created based on the needs of one or more campaigns or independent applications. The data from 204 and 206 may be used by internal or external personnel to develop the ideal set of data values to be encoded and associated with a unique identifier. A unique profile may be variously structured. In one embodiment, it is keyed to profile attributes within the local data (first set) and/or remote profile data (second set of data) specific to a campaign. The profiles may be stored in a localized location and be updated on an ongoing basis based on user behavior 204, changes in external data 206, or locally modified by an application 214. The present system prevents all unauthorized access to the profile data because in exemplary embodiments it may be stored securely within the customer's premise equipment. In these embodiments, the data need never be transmitted over the network to the network components 108. Further, in these embodiments, the profile need not contain any identifying information regarding the user, nor the actual usage patterns. Rather, such data in this embodiment may be abstracted to reflect certain advertisements without actually storing usage patterns. Further, in these embodiments, the collected data may remain on the electronic device from which it was collected or, alternatively, in another electronic device selectable by the user or in their possession. In one embodiment, the data may be stored on a computer-readable medium operatively connected to the electronic device, such as an eSATA disk drive. In yet another embodiment, the computer-readable medium may be operatively connected through a wireless communication protocol, such as IEEE 802.xx. In one embodiment, the data may be stored on a home server within the user location premise.

At step 210, a request may be received from a third party requesting to provide content to a plurality of user locations that meet criteria of a plurality of profile attributes. Indeed, certain aspects of the invention relate to systems and methods that relate to the creation of profiles and allow third parties to access the profiles while ensuring the identity of the users remains secure. In one embodiment, a graphical user interface ("GUI") may be configured to allow third-parties to provide the selection criteria. Those skilled in the art will readily appreciate with the benefit of this disclosure that the selection criteria may include one or more profile attribute, such as, for example, age, income, residence, political affiliations, quantity of children, types of cars, and any other profile attributes. The GUI may be available to third parties through a network portal, such as an intranet or the Internet. In one embodiment, the exemplary user interface may be utilized by an employee of the broadcast provider who may then determine if, and how, a specific third-party would benefit from providing content to specific user locations.

For example, at the Canoe web portal, an advertiser may be able to target advertising to users who are republican, have small children at home, and donate to religious causes. Tagged advertisements may be sent to various service providers who then optionally control which users ultimately see the advertisements. The users who actually receive the advertisements may be determined via a combination of criteria from the advertising server coupled with locally stored viewing information. In one embodiment, a third-party may be permitted to provide selection criteria for selecting a plurality of profiles to which electronic content is to be transmitted.

At step 212, electronic content from the third-party as well as other content, may be transmitted to a plurality of user locations. The content may be transmitted through a head end application to a client content application. The content may include audio, video, data and/or other content configured to be displayed on an internet browser, a banner, text message, a program guide, a TV channel, a DVR recorded show, a VOD movie and/or combinations thereof. The electronic content may be encoded such that it may only be associated with a specific campaign and/or uniquely tagged profile data accessed by an authorized user and/or on a specific electronic device at the end-user location for which the content is targeted. As discussed above in relation to step 206, some third-parties may not wish to disclose proprietary information, such as their customer lists or even the fact that they are advertizing a specific promotion. Therefore, in one embodiment, the encoding also prevents the broadcast provider from knowing the information within the content, which may only be viewed or listened to at the user's authorized device. In one such embodiment, the data elements required by a decisioning system may be linked directly to a business transaction (such as where a third party may provide selection criteria—which is discussed in more detail below). In this embodiment, a unique identifier may be assigned to a string that can only be accessed by the authorized content or media that is tied to the business transaction. The data elements that are part of the business transaction may be encoded into a single string in a format known only to the service provider and third party.

The transmission (and presentment) of the content to a user may be fulfilled through a plurality of different methodologies. A decisioning module or module 142 in a set-top box 112 may be utilized to determine which portion(s) of the content to present to the user (FIG. 1). Indeed, having the decisioning module 142 at the user location ensures that sensitive information, such as the profile data, is not subject to interception by unauthorized parties. Furthermore, while a third party business may target their advertising to interested individuals, those individual's identities cannot be determined, thus protecting their privacy.

The determination of what portion(s) of the content to present to a user and/or to a specific electronic device may depend on one or more profile attributes. For example, while the third-party business may want to only target those individuals in a certain zip code, the company may further wish to provide different advertisements to different segments of that profile group. For example, an automotive company may wish to target an audience within a certain radius of a car dealership that makes a predefined income, but realizes that one individual may be more interested in a sports car while another individual may be more interested in a minivan.

Figure 3:
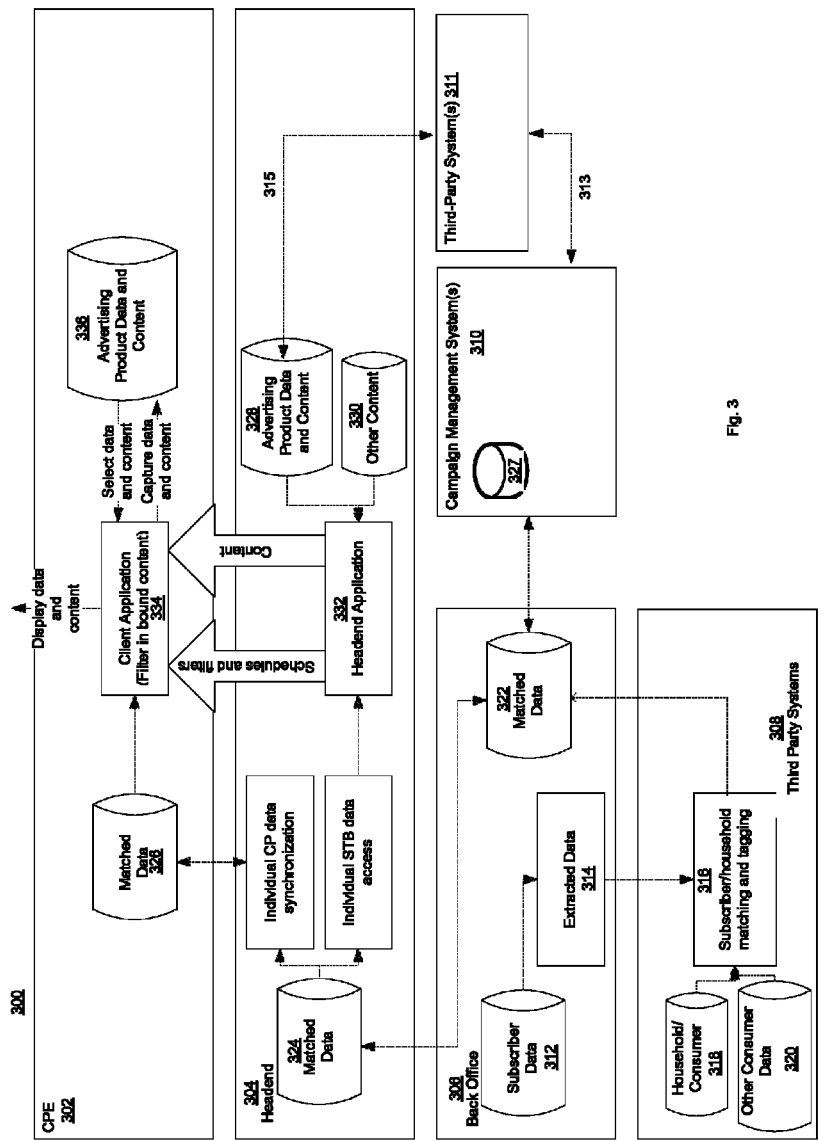
FIG. 3 shows a diagram illustrating an exemplary collection and distribution flow of profile data in a system in accordance with one embodiment of the invention.

Referring to FIG. 3, a logic and flow block diagram is provided to show one exemplary collection and distribution system for use with targeted advertising including profile data and content. In this exemplary embodiment, the system 300 may be divided into customer premise equipment 302 (as explained above with respect to 112), head end 304, back office 306 (as explained above with respect to 108) and third party systems 308 (as explained above with respect to various Internet or Intranet portals (e.g., Canoe)). The CPE 302 may be variously configured to include matched data 326 for storing data that matches various criteria, a client application 334 for filtering inbound content based on particular profile data including usage data, and/or advertising product data and content 336 for capturing and selecting various data and content to output to the display/audio device. The advertising product data and content module 336 may output the same advertising content to the user over and over again and on every channel or on certain predetermined channels based on some predetermined algorithm or on an algorithm provided by the advertiser through, for example the portal. The algorithm may be a custom algorithm designed by the advertiser or some predefined algorithms provided by the portal as part of a drop-down selection menu. The head end 304 may include the matched data 324 with may be forwarded to the matched data storage 326 based on individual data synchronization and/or on individual set-top box data access algorithms. Matched data is composed of one or more user data elements associated with a unique identifier and encoded using a known algorithm, see e.g. 208 on FIG. 2. The selection criteria may be transmitted in-band or out-of-band to matched data 326. The head end application 332 may provide the data periodically on unused out-of-band space or on a pre-defined schedule on an in-band channel. For example, the head end application 332 may transmit all of the advertising data for a particular geographic area at a certain time in the morning (e.g. 3:00 am) on a particular channel. The set top box could tune to a particular frequency or select certain time slots to acquire and then filter the advertising data. The advertising product data and content may be stored, for example in advertising servers 328. Additional content such as additional information if the user so requests on the advertisements may be provided in storage 330.

The back office 306 may store and process subscriber data 312 in order to extract certain parameters 314 which can then be combined with other third party systems 308 data and offered as parameters to advertisers. For example, the extracted data 314 may include address, name, telephone number, and other pertinent data. This data may be combined with data from a third party system 308 such as a targeted advertising company (e.g., a direct mailing company). The targeting advertising company may collect data on the household including the purchases made at a grocery store, the coupons utilized, the buying habits, credit ratings, and other pertinent data. This data may then be combined with the subscriber data either in the back office 306 and/or in the third party system 308 and forwarded to a matched data targeted advertising server 322. The matched data targeted advertising server 322 may alternatively be interfaced to one or more campaign management system(s). The campaign management system 310 may include one or more servers and/or internet/Intranet portals 327 allowing access by advertisers to select certain criteria and bind their advertisements to that criteria. The servers 327 may also allow the advertisers to select the algorithm by which the targeted advertisements may be displayed by the CPE 302. This information is then feed back into the head end 304 and then to the CPE 302 for combination and filtering and ultimately to display and/or play to the end user.

Subscriber data 312 may be utilized to provide extracted data (see 314). The removal of certain identifying information may be used to ensure any later usage of the data cannot be correlated back to a specific subscriber of the service provider's system. The subscriber data that has been extracted from subscriber data 312 is matched and tagged with data obtained from a third-party system 308 (see 316). As seen in FIG. 3, the data may come from a plurality of different sources, such as sources 318 and 320 to produce the matched data 322. The matched data may be transmitted through the head end (see 324) and be transmitted in the memory 326 at customer premise equipment 302 at the end-user's location. In this regard, both the first set of profile data created, for example, in step 204 and the second set of profile data created, for example, in step 206 may be stored securely at one or more CPEs 302 at the end-user location.

The GUI may be stored on a campaign management system 310. As seen, the campaign management system 310 may include one or more reference databases or servers 327 which may create matched data sets 322 which may provide information regarding the profiles to aid in the selection process. The campaign management system 310 may also comprise computer-readable mediums that contain data regarding the ordering of content, reporting and billing, and other data regarding content from the third party. In one embodiment, a third-party system 311 may be separate but operatively connected to the campaign management system 310. In one such embodiment, one or more servers and/or internet/Intranet portals 327 of the campaign management system 310 may share the encoding for the token with the third-party system 311 (see e.g. 313). The third-party system 311 may then make or otherwise receive a unique key for a particular campaign. As shown in exemplary step 315, the third-party system 311 may transmit the unique keys and the content directly to a head end device, such as providing the content to the Advertising Product Data and Content 328 of head end device 304.

FIG. 4 shows a table of users that may receive transmitted content according to an illustrative embodiment. As seen in table 402, four users are represented by rows 404-410, respectively. User 404 meets "Criteria A" (see column 412), however, does not meet "Criteria B" (column 414). Therefore, in accordance with one embodiment where only end-user locations meeting both criteria A and B will be sent the content, user 404 will not receive the content regarding the minivan or the sports car. As seen in FIG. 4, users 406, 408 and 410 meet the criteria and will receive the content (as discussed below, however, the same portion of the content may not be displayed at each of the locations). Looking to column 416 of FIG. 4, user 2 is watching channel 117, which corresponds to sports programming, while user 3 is watching channel 916, which corresponds to children's programming. Thus, in one embodiment, a portion of the content that relates to the sports car may be presented to user 2, while a portion of the content that relates to the minivan may be presented to user 3.

In one embodiment, the content transmitted in step 212 is a single file. For example, in one embodiment, a single MPEG audiovisual file may be transmitted. The decisioning module 142 may then determine what portion(s) of the content to present to the user. Certain segments of the single MPEG may be selected and extracted from the file to present to the user. As also shown in FIG. 4, no portion of the content was displayed to user 4. In one embodiment, this may be due to the fact that user 4 did not utilize the set top box during a predefined time frame for presentment of the content. An optional time frame requirement may be associated with the content to allow third parties to ensure their advertisements are viewed within a certain time frame, such as during a sporting event on a specific channel (i.e., the Super Bowl) or at a certain time (prime time).

In one embodiment, step 216 may be implemented, which determines whether a profile attribute represented in the profile has changed. Step 216 may occur before and/or after step 214. If step 216 occurs before step 214, decisioning module 142 may determine that the content is no longer relevant to the user or that a different portion is relevant to the user. Because the content may already be located at the consumer premise equipment or otherwise readily available to the user, the different portion does not have to be retrieved from the third party before presenting it to the user.

Alternatively, step 220 may be utilized to obtain additional content to present. Furthermore, if at step 216, it is determined that one or more specific attributes have been changed, then the profile of step 208 may be updated accordingly. Indeed, a user's habits and usage patterns may be utilized to update the profile. Because the profile may be locally stored and the raw data need not be pushed back to the broadcast provider or any other third party, no other party may directly correlate the data with that particular user.

Likewise, once the user is presented with a first portion of the content, step 216 may be implemented after 214 to determine whether to present additional content. For example, the user may have provided a user input, such as with a remote control, that indicates he or she is interested in more information. In one embodiment, another portion is then presented to the user (step 218). The presentment of the second portion may be immediate or may be scheduled to be presented during a regular allotted time slot during regular programming. The different portions of the content are not required to be presented on the same electronic device. For example, in one embodiment, the first portion of the content may be displayed on the television while the user is watching a broadcasted television show, while a second portion may be presented on an internet banner advertisement while the user visits a particular site or at a particular time, still other content may be displayed on a program guide or other application.

Again, the secure profile may be updated to ensure the same portion of content is or alternatively is not repeatedly presented to a user. Indeed, predefined rules may be established, whether through user-established settings or by the third-party, that the content (or a portion thereof) may only be presented to a user a select number of times and/or must be presented to the user at least a set number of times. One or more such rules may involve updating the profile of step 208. Those skilled in the art will readily appreciate that any large number of combinations are within the scope of this disclosure, and the above example is merely exemplary.

Confirmation that a portion of the content was presented to the user may be implemented (step 222). For example, looking to FIG. 4, portions of the content were presented to users 2 and 3, but not user 4 (for example, as indicated above, user 4 was may not have been viewing any content during a predefined time interval). Step 222 may be coupled with or followed by step 224 in one or more embodiments. For example, the information in column 416 may be provided to the third party to indicate that that number of users who watched each "portion" of the content. Furthermore, additional data may also be collected for one or more individuals (see column 418, showing that secondary data was collected from user 3). Exemplary data that may be provided in step 224 may includes, but is not limited to: when the user was presented with the portion, was a second portion presented, did the user request additional content, and combinations thereof.

In further embodiments, data reported back may include statistics regarding specific attributes in relation to the portion of content presented to a user. For example, statistics may indicate that 50,000 users in a specific metro area that saw a particular portion of the content (for example, a specific advertisement). Yet further statistics may indicate that of those 50,000 users, a specified portion had a value of 1 for a particular attribute and/or another specified portion had a value of 2 for that same particular attribute. Those skilled in the art will readily understand in view of this disclosure that several different statistical methodologies may be utilized to report the results in step 224.

Utilizing one or more methods of the invention would allow service providers to quantify the number of users who viewed or listened to an advertisement, thereby accurately determining any fees to charge in a fee-based system. In one embodiment, the system is configured such that once the content is transmitted to the user location in step 212, at least a portion of the content is required to be displayed. For example, the service provider may determine whether a targeted electronic device is active before transmitting the content. Thus, in one embodiment, confirmation may readily be determined by the quantity of electronic devices that the content was transmitted to. As discussed above, an encoded string may be utilized to transmit the content to the end-user's location. In one such embodiment, the content may only be "unlocked" for viewing if the profile associated with the electronic device is validated. The content may also be encoded to ensure that only a specific electronic device and/or a specific user may view (or listen) to the content.

Exemplary Method of Using Tokens

FIG. 5 is a flowchart of an exemplary method of conducting an advertizing campaign in accordance with an embodiment of the invention. At step 502, a transaction for the campaign is initiated in which a unique identifier, such as a token, is generated for an advertiser, specific advertisement campaign or other application. The token may be generated and associated with a plurality of data elements. The data elements may represent one or more of the profile attributes discussed above, such as for example, income, credit score, family size, etc. As discussed below, the exact data elements utilized may be negotiated during the development of the campaign (see step 504). The unique identification and related information may be stored on a computer-readable medium, such as database 327, at the campaign management system 310 shown in FIG. 3 and FIG. 2 (208 and 210)

As indicated with the bi-directional arrow between steps 502 and 504, the creation and development of the campaign may be ongoing interrelated process. In one embodiment, the work performed in steps 502 and 504 must be closely coordinated since the flow of content from 504 to 508 and the flow of tokens from 506 and 508 may be separate independent activities. The work performed in 506 is may be performed by the service provider and/or trusted third party and involves the generation and timely delivery of the tokens to 508. In one embodiment, the work performed in 504 may be performed by the service provider, yet in another embodiment, the work could also be performed by the content provider or on behalf of the content provider by a third party. As known to those skilled in the art, potential advertisers and the service provider alike generally understand that data collected as part of providing goods and services to consumers should remain confidential to protect the interest of the consumers. Indeed, several aspects of the invention relate to ensuring that end-users receive relevant advertisements without sacrificing the security of their personal and private information. In this regard, an advertiser would disfavor disclosing its customer lists to the service provider and vice versa. In one embodiment, a third-party blind matching company may be utilized during the campaign development (step 308) to match an advertiser's attribute list with the subscriber data of the service provider. Alternatively, a third-party blind matching company is not required; however, the parties conduct a blind exchange of at least some confidential information. For example, if the advertiser is a car company, they may wish to know the quantity of individuals who have a lease coming due within a predefined time period and/or the quantity of users who have an automobile that is was produced before a certain year.

In one embodiment, the service provider's data regarding its subscribers may be matched and tagged with "secret" identifiers from the advertiser (i.e., the car company) that don't reveal the identity of the information, such as "CAR COMPANY TAG #1." Therefore, the service provider is still able to provide a quantity of individuals who meet the selection criteria of the tags, but is not capable of determining what criteria those subscribers meet. In yet other embodiments, identifiers that are not secret to the service provider may also be used in conjunction with or independently of the "secret" tags. For example, the service provider may identify a group of individuals who meet the criteria of "CAR COMPANY TAG #1" and one or more additional criteria, such as related to viewing habits or any other profile information. Using such a system allows the service provider and the advertiser to determine which segment(s) of the service-provider's subscribers to target for the advertisement campaign and/or how many groups that will be segmented in the advertisement campaign.

In some embodiments, a secure blind third party agency or other mechanisms might be utilized that will protect the data integrity and security of both a service provider's data and that of an outside advertising agency. For example, the advertising campaign manager working for a major auto company may provide some data to a blind source such as those customers in Philadelphia that have gone into a specific auto dealer in the last month and/or those customers whose lease is about to expire. The service provider might provide the blind third party source with the auto tax records for the family including the type of cars the family currently owns, the number and age of the children, whether the family watches the outdoor network, and the income level of the family. In some embodiments, the family might select to opt out of one or more of these parameters. The blind third party source may then match the names and addresses from the advertising agency representing the auto maker with the types of cars provided from the service provider's database and generate one or more unique tokens for the service providers. The advertising company would then provide several commercials and/or other media content to the service provider matched to the tokens. As explained in detail below and in relation to FIG. 4, based upon the presence of token 1, the advertising agency may associate a minivan commercial for a family with small children who already have a minivan, for token 2 the advertising agency might associate a sports car commercial for a family with a single male and a high income stream, for token 3, the advertising agency might associate a sports utility vehicle for a male head of household who watches an outdoor-related network.

Once the data elements are determined, they are provided to the service provider during step 502. As shown in illustrative embodiment of FIG. 5, encoding rules are also created at step 502. Specifically, the encoding rules may be of any structure agreed upon by the service provider and the advertiser that reflects how the attributes will be represented. The encoding rules and the data elements from the transaction creation (step 502) are then utilized in a derivation process (step 506). During the derivation process of step 506, the data elements are utilized to assign a token to a plurality of subscribers specific to the advertising campaign. In one embodiment, the token may be created from information obtained from the combination of the data in database 327 at the campaign management system 310 and data obtained from a third-party system, such as the third parties 308 shown in FIG. 3 (which may have been previously matched and tagged (see element 316 of FIG. 3). The tokens may be transmitted (and stored) on the head end device 304, for example as matched data 324. In another embodiment, the token may be stored on the CPE 302 at matched data 326. The matched data (324 and/or 326) may be updated based upon actions by the decisioning module 142, user actions, and/or third party applications.

In this regard, unlike certain prior art systems, several hundred business rules do not have to be transmitted into the CPE which may have limited memory and processing capacity. Rather, as shown in the illustrated embodiment, head end devices, such as those shown in head end 304 in FIG. 3 may be utilized for any required filtering of business rules and only the token that is specifically keyed to the advertising campaign is required to be downloaded to the CPE. The token transmitted to the CPE may comprise the attributes with an identifier of the encoded "secret" and/or known tags.

At step 508, a runtime presentation engine is utilized after the token has been transmitted to the CPE. In one embodiment, an advertisement having several portions is received at the CPE. In one embodiment, the advertisement is a single file, such as an MPEG file. In another embodiment, the advertisement is an active program that is capable of reading the token applicable to the specific advertisement (discussed in more detail below). Any individual CPE may have several different tokens stored on the CPE or attached storage devices at any given time. Application program interfaces (APIs) are configured to not allow access to the encoding rules, thereby further protecting the privacy of the consumers. As such, there can be do direct correlation to income, credit scores, or any other profile data contained in the data elements. Rather, upon running of the application, the program will access a set of access APIs via the unique identifier that was initially negotiated. The data element string which is still encoded may be read by the decisioning module 142 to choose a specific portion of the advertisement to present to the subscriber.

In those embodiments where the advertisement is an active application, it may read the token and, in accordance with the encoding rules and data elements, play a specific portion of the advertisement. For example, as discussed in relation to FIG. 4, one user may receive advertisement portion that is directed towards a sports car while another user receives a portion that is directed towards a minivan. Thus, the specific presentation presented to the user will depend on the presence of the token on the CPE, which is includes specific data elements and governed by the encoding rules.

The tokens may be managed to support one or more advertisement campaigns. For example, as discussed above, some CPEs have limited storage, thus one or more tokens may be configured to be deleted or otherwise deactivated after a predefined time period. This feature may also be utilized to ensure that the advertisers' commercials are only functional during the proper time interval. For example, an advertiser may only contract for their advertisement that run during a specific sporting event, such as the Super Bowl, therefore, enabling the token to only allow the advertisement to function during the Super Bowl. In another embodiment, computer-executable instructions may enable a feature that confirms when at least one portion of the advertisement is provided to the user. This too may also be useful for accounting purposes. The confirmation, however, will not contain an indication of the data elements or the encoding rules. Furthermore, in accordance with certain embodiments, the token may be utilized as a front end to specific data element that is known to be used throughout multiple campaigns. For example, profile attributes relating to income are often utilized across several campaigns. Therefore, in one embodiment, one or more profile attributes relating to income are referenced via the token on the CPE to be considered by several advertisement campaigns.

The tokens may be modified by the decision module or other function based on an action taken. Once modified the modified token will be replicated to one or more data stores in server or CPE based data stores.

I claim:

1. A device comprising:
   at least one processor; and
   at least one memory having stored thereon machine executable instructions, which when executed by the at least one processor, cause the device to:
      receive content from a service provider;
      create a unique profile locally at the device that represents a user location of a user of the device and is keyed to profile attributes selected from usage patterns of the device and profile data obtained from an external source; and
      determine, at the device, using unique profile data from the unique profile only retrievable locally at the device, a portion of the received content to be presented to the user of the device based upon at least one profile attribute of the unique profile, wherein the unique profile prevents third parties from identifying, from the unique profile, the user location or the user.

2. The device of claim 1, wherein the device comprises one or more of: a set-top box, a computer, a telephone, a device connectable to a mobile device, or combinations thereof.

3. The device of claim 1, wherein the machine executable instructions, when executed by the at least one processor, further cause the device to:
   store profile data obtained from a direct marketing company external source.

4. The device of claim 1, wherein the received content is encoded such that it may only be accessed at the device if the user is authorized for the device at the user location.

5. The device of claim 1, wherein the received content comprises a plurality of advertisements and the portion of the content presented is one of the plurality of advertisements.

6. The device of claim 5, wherein the received content is a single file.

7. The device of claim 6, wherein the single file is a multimedia file.

8. The device of claim 1, wherein the at least one memory has stored thereon machine executable instructions, which when executed by the at least one processor, further cause the device to:
   determine that a profile attribute represented within the unique profile has changed; and
   present a second portion of the content to the user at the user location.

9. The device of claim 1, wherein the at least one memory has stored thereon machine executable instructions, which when executed by the at least one processor, further cause the device to:
   determine that a profile attribute represented within the unique profile has changed; and
   request additional content to present to the user at the user location.

10. The device of claim 1, wherein the content comprises one or more of: audio, video, data configured to be displayed on an internet browser, a banner, or combinations thereof.

11. The device of claim 1, wherein the content is provided by a service that comprises one or more of: cable, satellite, internet, telephony, or combinations thereof.

12. The device of claim 1, wherein the at least one memory has stored thereon machine executable instructions, which when executed by the at least one processor, further cause the device to:
   confirm that the portion of the received content was presented to the user at the user location; and
   transmit a confirmation signal indicating that the portion of the received content was presented.

13. The device of claim 1, wherein the received content further comprises:
   a plurality of portions encoded to prevent a service provider from knowing identifying information within the received content.

14. A method comprising:
   creating a profile locally at at least one device at a user location for a user of a service, the profile comprising data that is keyed to profile attributes selected from a set of profile data comprising usage patterns from the at least one device at the user location associated with the user;
   receiving content at the user location, for presentation to the user; and
   determining, at the one device, using user profile information, from the profile, only retrievable locally at the one device, whether there are any modifications to the profile of the user at the user location, and after receiving the content at the user location and based upon the determination, determining, locally, a portion, if any, of the content to present to the user at the user location, wherein the portion of the content is less than a total amount of content received at the user location.

15. The method of claim 14, wherein the content is encoded such that it may only be accessed if the user is authorized for the one device at the user location.

16. The method of claim 14, wherein the service comprises one or more of: cable, satellite, internet, phone, or combinations thereof.

17. The method of claim 16, wherein the at least one device comprises one or more of: a set-top box, a computer, telephone, a device connectable to a mobile device, or combinations thereof.

18. The method of claim 14, wherein the determining of whether there are modifications to the profile further comprises determining based on one or more of: past usage of one or more devices in a household, current usage of one or more devices in the household, or combinations thereof.

19. The method of claim 14, further comprising:
generating for presentation a second portion of the received content.

20. The method of claim 14, further comprising:
determining that a profile attribute represented within the profile has changed; and
requesting additional content to present to the user at the user location.

21. The method of claim 14, further comprising:
confirming that the content was presented to the user at the user location.

22. The method of claim 14, wherein the received content further comprises:
a plurality of portions encoded to prevent a service provider from knowing identifying information within the received content.

23. A method comprising:
creating, locally at a local device, user service profiles comprising usage patterns associated with the local device;
using third-party selection criteria to select a user service profile;
encoding and transmitting content for presentation to a user associated with the selected user service profile;
determining, at the local device, using unique profile information, from the user service profiles, only retrievable locally at the local device, whether there are any modifications to the selected user service profile; and
based upon the determining, locally generating for presentation a portion of the content.

24. The method of claim 23, wherein the encoded and transmitted content may only be accessed if the user is authorized on the local device at a user location.

25. The method of claim 23, wherein the user service profiles is associated with a service comprising one or more of: cable, satellite, internet, phone, and combinations thereof.

26. The method of claim 23, wherein the local device comprises one or more of: a set-top box, a computer, telephone, a device connectable to a mobile device and combinations thereof.

27. The method of claim 23, wherein the determining considers aspects comprising one or more of: past usage of one or more devices at a user location, current usage of one or more devices at the user location, and combinations thereof.

28. The method of claim 23, further comprising:
locally presenting a second portion of the content.

29. The method of claim 23, further comprising:
determining that a profile attribute represented within the selected user service profile has changed; and
requesting additional content to present to the user.

30. The method of claim 23, further comprising:
confirming that the portion of the content is presented to the user.

31. The method of claim 23, wherein the content comprises a plurality of encoded portions to prevent a service provider from knowing identifying information within the content.

* * * * *

UNITED STATES PATENT AND TRADEMARK OFFICE
CERTIFICATE OF CORRECTION

| | |
|---|---|
| PATENT NO. | : 8,856,908 B2 |
| APPLICATION NO. | : 12/370426 |
| DATED | : October 7, 2014 |
| INVENTOR(S) | : Walter F. Michel |

It is certified that error appears in the above-identified patent and that said Letters Patent is hereby corrected as shown below:

In the Specification

Column 5, Line 27:
Please delete "108," and insert --110,--

Column 5, Line 28:
Delete "110." and insert --108.--

Signed and Sealed this
Twenty-ninth Day of September, 2015

Michelle K. Lee
*Director of the United States Patent and Trademark Office*